(12) United States Patent
Urbanek

(10) Patent No.: US 9,161,325 B1
(45) Date of Patent: Oct. 13, 2015

(54) SUBSCRIBER IDENTITY MODULE VIRTUALIZATION

(71) Applicant: Sprint Communications Company L.P., Overland Park, KS (US)

(72) Inventor: Robert E. Urbanek, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 56 days.

(21) Appl. No.: 14/085,474

(22) Filed: Nov. 20, 2013

(51) Int. Cl.
*H04B 1/38* (2015.01)
*H04W 60/00* (2009.01)

(52) U.S. Cl.
CPC .................................. *H04W 60/005* (2013.01)

(58) Field of Classification Search
CPC ....... H04B 1/3816; H04W 12/06; H04W 8/18
USPC .............. 455/73, 551, 552.1, 558, 514, 550.1
See application file for complete search history.

(56) References Cited

U.S. PATENT DOCUMENTS

| | | | |
|---|---|---|---|
| 5,303,378 | A | 4/1994 | Cohen |
| 5,321,735 | A | 6/1994 | Breeden et al. |
| 5,796,952 | A | 8/1998 | Davis et al. |
| 6,131,024 | A | 10/2000 | Boltz |
| 6,177,860 | B1 | 1/2001 | Cromer et al. |
| 6,219,712 | B1 | 4/2001 | Mann et al. |
| 6,363,150 | B1 | 3/2002 | Bhagavath et al. |
| 6,477,180 | B1 | 11/2002 | Aggarwal et al. |
| 6,614,893 | B1 | 9/2003 | Paiz |
| 6,668,322 | B1 | 12/2003 | Wood et al. |
| 6,691,230 | B1 | 2/2004 | Bardon |
| 6,754,784 | B1 | 6/2004 | North et al. |
| 6,823,454 | B1 | 11/2004 | Hind et al. |
| 6,824,064 | B2 | 11/2004 | Guthery et al. |

(Continued)

FOREIGN PATENT DOCUMENTS

| | | |
|---|---|---|
| WO | WO2011025433 A1 | 3/2011 |
| WO | WO2012078753 A1 | 6/2012 |

(Continued)

OTHER PUBLICATIONS

Notice of Allowance dated Dec. 22, 2014, U.S. Appl. No. 13/470,203, filed May 11, 2012.

(Continued)

*Primary Examiner* — Tuan Pham

(57) ABSTRACT

A mobile communication device. The device comprises a first wireless communication identity stored in a first partition of the memory, wherein a wireless communication identity comprises a network access identity, a list of wireless communication systems to which the device is authorized to attach, a rule set for prioritizing among the wireless communication systems identified in the list, and a table of device rules. The device further comprises an application stored in the memory that, when executed by the processor, detects a triggering event and in response to the triggering event changes the active wireless communication identity of the mobile communication device to one of the wireless communication identities stored in the partitions of the memory and applies device rules associated with the wireless communication identity, where the mobile communication device conducts wireless communication via the radio transceiver based on the active communication identity and the associated device rules.

19 Claims, 6 Drawing Sheets

(56) References Cited

U.S. PATENT DOCUMENTS

| | | |
|---|---|---|
| 6,895,234 B1 | 5/2005 | Laursen et al. |
| 7,165,191 B1 | 1/2007 | Vakrat |
| 7,266,371 B1 | 9/2007 | Amin et al. |
| 7,366,806 B2 | 4/2008 | Milenkovic et al. |
| 7,387,240 B2 | 6/2008 | Ziegler |
| 7,493,111 B2 | 2/2009 | Knowles |
| 7,519,824 B1 | 4/2009 | Peyravian et al. |
| 7,552,467 B2 | 6/2009 | Lindsay |
| 7,571,364 B2 | 8/2009 | Whetsel |
| 7,650,645 B1 | 1/2010 | Langendorf et al. |
| 7,716,720 B1 | 5/2010 | Marek et al. |
| 7,817,988 B2 | 10/2010 | Kruis et al. |
| 7,873,837 B1 | 1/2011 | Lee et al. |
| 7,895,642 B1 | 2/2011 | Larson et al. |
| 7,904,895 B1 | 3/2011 | Cassapakis et al. |
| 7,921,303 B2 | 4/2011 | Mauro, II |
| 8,060,449 B1 | 11/2011 | Zhu |
| 8,073,428 B2 | 12/2011 | Khetawat et al. |
| 8,086,238 B1 | 12/2011 | Kosar |
| 8,107,926 B2 | 1/2012 | Goto |
| 8,112,794 B2 | 2/2012 | Little et al. |
| 8,185,101 B1 | 5/2012 | Wiseman et al. |
| 8,190,919 B2 | 5/2012 | Natarajan et al. |
| 8,204,480 B1 | 6/2012 | Lindteigen et al. |
| 8,238,823 B2 | 8/2012 | Maugars et al. |
| 8,260,281 B2 | 9/2012 | Urbanek |
| 8,271,336 B2 | 9/2012 | Mikurak |
| 8,316,237 B1 | 11/2012 | Felsher et al. |
| 8,401,538 B2 | 3/2013 | Urbanek |
| 8,401,595 B2 | 3/2013 | Zhu et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,433,953 B1 | 4/2013 | Gaudette et al. |
| 8,442,521 B2 | 5/2013 | Fleischman et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,504,097 B1 | 8/2013 | Cope et al. |
| 8,571,536 B2 | 10/2013 | Urbanek |
| 8,612,967 B1 | 12/2013 | Delker |
| 8,626,165 B1 | 1/2014 | Narasimhan et al. |
| 8,631,247 B2 | 1/2014 | O'Loughlin et al. |
| 8,632,000 B2 | 1/2014 | Laracey |
| 8,649,770 B1 | 2/2014 | Cope et al. |
| 8,666,383 B1 | 3/2014 | Mauer et al. |
| 8,667,607 B2 | 3/2014 | Paczkowski et al. |
| 8,707,056 B2 | 4/2014 | Felton |
| 8,712,407 B1 | 4/2014 | Cope et al. |
| 8,718,554 B2 | 5/2014 | Abel |
| 8,719,586 B1 | 5/2014 | Paleja et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,797,875 B2 | 8/2014 | Martin et al. |
| 8,811,971 B2 | 8/2014 | Corda et al. |
| 8,825,039 B2 | 9/2014 | Mizuguchi |
| 8,831,998 B1 | 9/2014 | Cramer et al. |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,881,977 B1 | 11/2014 | Paczkowski et al. |
| 8,886,925 B2 | 11/2014 | Qureshi et al. |
| 8,909,291 B1 | 12/2014 | Spanel et al. |
| 8,954,588 B1 | 2/2015 | Bertz et al. |
| 8,984,592 B1 | 3/2015 | Paczkowski et al. |
| 8,989,705 B1 | 3/2015 | Katzer et al. |
| 9,015,068 B1 | 4/2015 | Bertz et al. |
| 9,021,585 B1 | 4/2015 | Paczkowski et al. |
| 9,026,105 B2 | 5/2015 | Shipley et al. |
| 9,027,102 B2 | 5/2015 | Katzer et al. |
| 9,042,877 B1 | 5/2015 | Ghoshal et al. |
| 9,049,013 B2 | 6/2015 | Paczkowski et al. |
| 9,049,186 B1 | 6/2015 | Paczkowski et al. |
| 2002/0035697 A1 | 3/2002 | McCurdy et al. |
| 2002/0091569 A1 | 7/2002 | Kitaura et al. |
| 2002/0091931 A1 | 7/2002 | Quick, Jr. et al. |
| 2002/0098389 A1 | 7/2002 | Gaines |
| 2002/0156911 A1 | 10/2002 | Croman et al. |
| 2002/0166070 A1 | 11/2002 | Mualem et al. |
| 2002/0174344 A1 | 11/2002 | Ting |
| 2002/0181503 A1 | 12/2002 | Montgomery, Jr. |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0217145 A1 | 11/2003 | Leung et al. |
| 2003/0229514 A2 | 12/2003 | Brown |
| 2003/0237002 A1 | 12/2003 | Oishi et al. |
| 2004/0033798 A1 | 2/2004 | Robin et al. |
| 2004/0092248 A1 | 5/2004 | Kelkar et al. |
| 2004/0093109 A1 | 5/2004 | O'Connor et al. |
| 2004/0116163 A1 | 6/2004 | Kim et al. |
| 2004/0137890 A1 | 7/2004 | Kalke |
| 2004/0137891 A1 | 7/2004 | Clark et al. |
| 2004/0158840 A1 | 8/2004 | Rothman et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Ringborg et al. |
| 2004/0261041 A1 | 12/2004 | Parakkuth et al. |
| 2005/0015601 A1 | 1/2005 | Tabi |
| 2005/0052994 A1 | 3/2005 | Lee |
| 2005/0079855 A1 | 4/2005 | Jethi et al. |
| 2005/0085222 A1 | 4/2005 | Przybilski et al. |
| 2005/0091505 A1 | 4/2005 | Riley et al. |
| 2005/0119001 A1 | 6/2005 | Watanabe |
| 2005/0138433 A1 | 6/2005 | Linetsky |
| 2005/0181796 A1 | 8/2005 | Kumar et al. |
| 2005/0188262 A1 | 8/2005 | Rosenman et al. |
| 2005/0197098 A1 | 9/2005 | Trossen |
| 2005/0235166 A1 | 10/2005 | England et al. |
| 2005/0239481 A1 | 10/2005 | Seligmann |
| 2005/0289355 A1 | 12/2005 | Kitariev et al. |
| 2006/0025151 A1 | 2/2006 | Karaoguz et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0135144 A1 | 6/2006 | Jothipragasam |
| 2006/0154651 A1 | 7/2006 | Knowles |
| 2006/0156026 A1 | 7/2006 | Utin |
| 2006/0164978 A1 | 7/2006 | Werner et al. |
| 2006/0190605 A1 | 8/2006 | Franz et al. |
| 2006/0203722 A1 | 9/2006 | Oommen |
| 2006/0208071 A1 | 9/2006 | Chang et al. |
| 2006/0212853 A1 | 9/2006 | Sutardja |
| 2006/0224901 A1 | 10/2006 | Lowe |
| 2006/0235944 A1 | 10/2006 | Haslam |
| 2006/0236325 A1 | 10/2006 | Rao et al. |
| 2006/0245438 A1 | 11/2006 | Sajassi et al. |
| 2006/0246949 A1 | 11/2006 | Gupta et al. |
| 2006/0258289 A1 | 11/2006 | Dua |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0004404 A1 | 1/2007 | Buckley et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0078988 A1 | 4/2007 | Miloushev et al. |
| 2007/0079120 A1 | 4/2007 | Bade et al. |
| 2007/0082655 A1 | 4/2007 | Link, II et al. |
| 2007/0094273 A1 | 4/2007 | Fritsch et al. |
| 2007/0094691 A1 | 4/2007 | Gazdznski |

(56) References Cited

U.S. PATENT DOCUMENTS

| | | |
|---|---|---|
| 2007/0099599 A1 | 5/2007 | Smith et al. |
| 2007/0118880 A1 | 5/2007 | Mauro, II |
| 2007/0129057 A1 | 6/2007 | Xu et al. |
| 2007/0130156 A1 | 6/2007 | U. Tenhunen et al. |
| 2007/0143210 A1 | 6/2007 | Yeung et al. |
| 2007/0162759 A1 | 7/2007 | Buskey et al. |
| 2007/0165654 A1 | 7/2007 | Chai et al. |
| 2007/0167167 A1 | 7/2007 | Jiang |
| 2007/0169084 A1 | 7/2007 | Frank et al. |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0190939 A1 | 8/2007 | Abel |
| 2007/0197234 A1 | 8/2007 | Gill et al. |
| 2007/0197261 A1 | 8/2007 | Humbel |
| 2007/0214332 A1 | 9/2007 | Sonoda et al. |
| 2007/0250645 A1 | 10/2007 | Meadows et al. |
| 2007/0254635 A1 | 11/2007 | Montelius |
| 2007/0276969 A1 | 11/2007 | Bressy et al. |
| 2007/0277223 A1 | 11/2007 | Datta et al. |
| 2008/0014867 A1 | 1/2008 | Finn |
| 2008/0020745 A1 | 1/2008 | Bae et al. |
| 2008/0022374 A1 | 1/2008 | Brown et al. |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0062900 A1 | 3/2008 | Rao |
| 2008/0065753 A1 | 3/2008 | Rao |
| 2008/0092213 A1 | 4/2008 | Wei et al. |
| 2008/0097793 A1 | 4/2008 | Dicks et al. |
| 2008/0109662 A1 | 5/2008 | Natarajan et al. |
| 2008/0121687 A1 | 5/2008 | Buhot |
| 2008/0146280 A1 * | 6/2008 | Sasse et al. .................. 455/558 |
| 2008/0159129 A1 | 7/2008 | Songhurst et al. |
| 2008/0159131 A1 | 7/2008 | Hoeflin et al. |
| 2008/0162361 A1 | 7/2008 | Sklovsky |
| 2008/0167027 A1 | 7/2008 | Gautier et al. |
| 2008/0171532 A1 | 7/2008 | Shieh et al. |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0225806 A1 | 9/2008 | Arian et al. |
| 2008/0244758 A1 | 10/2008 | Sahita et al. |
| 2008/0281511 A1 | 11/2008 | Miyata |
| 2008/0318547 A1 | 12/2008 | Ballou, Jr. et al. |
| 2009/0047923 A1 | 2/2009 | Jain et al. |
| 2009/0055278 A1 | 2/2009 | Nemani |
| 2009/0061840 A1 | 3/2009 | Fleischman et al. |
| 2009/0070272 A1 | 3/2009 | Jain |
| 2009/0075592 A1 | 3/2009 | Nystrom et al. |
| 2009/0089449 A1 | 4/2009 | Day |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0113425 A1 | 4/2009 | Ports et al. |
| 2009/0124250 A1 | 5/2009 | Topaltzas et al. |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0156209 A1 | 6/2009 | Franklin et al. |
| 2009/0182605 A1 | 7/2009 | Lappas et al. |
| 2009/0182634 A1 | 7/2009 | Park et al. |
| 2009/0193491 A1 | 7/2009 | Rao |
| 2009/0239518 A1 | 9/2009 | Feuillette |
| 2009/0247124 A1 | 10/2009 | de Atley et al. |
| 2009/0248445 A1 | 10/2009 | Harnick |
| 2009/0260004 A1 | 10/2009 | Datta et al. |
| 2009/0271321 A1 | 10/2009 | Stafford |
| 2009/0281947 A1 | 11/2009 | Erel |
| 2009/0300599 A1 | 12/2009 | Piotrowski |
| 2009/0307763 A1 | 12/2009 | Rawlins et al. |
| 2009/0312011 A1 | 12/2009 | Huomo et al. |
| 2009/0320028 A1 | 12/2009 | Gellerich et al. |
| 2010/0031325 A1 | 2/2010 | Maigne et al. |
| 2010/0048193 A1 | 2/2010 | Ortion et al. |
| 2010/0052844 A1 | 3/2010 | Wesby |
| 2010/0060456 A1 | 3/2010 | Forster |
| 2010/0075669 A1 | 3/2010 | Sparks et al. |
| 2010/0077487 A1 | 3/2010 | Travis et al. |
| 2010/0080143 A1 | 4/2010 | Topaltzas et al. |
| 2010/0082977 A1 | 4/2010 | Boyle et al. |
| 2010/0125904 A1 | 5/2010 | Nice et al. |
| 2010/0128598 A1 | 5/2010 | Gandhewar et al. |
| 2010/0130170 A1 | 5/2010 | Liu et al. |
| 2010/0133335 A1 | 6/2010 | Maguid et al. |
| 2010/0136960 A1 | 6/2010 | Knezevic |
| 2010/0142517 A1 | 6/2010 | Montemurro et al. |
| 2010/0146589 A1 | 6/2010 | Safa |
| 2010/0153721 A1 | 6/2010 | Mellqvist |
| 2010/0159876 A1 | 6/2010 | Brown et al. |
| 2010/0161724 A1 | 6/2010 | Sathyan et al. |
| 2010/0162028 A1 | 6/2010 | Frank et al. |
| 2010/0167696 A1 | 7/2010 | Smith et al. |
| 2010/0190469 A1 | 7/2010 | Vanderveen et al. |
| 2010/0192120 A1 | 7/2010 | Raleigh |
| 2010/0198943 A1 | 8/2010 | Harrang et al. |
| 2010/0203864 A1 | 8/2010 | Howard |
| 2010/0207742 A1 | 8/2010 | Buhot et al. |
| 2010/0217709 A1 | 8/2010 | Aabye et al. |
| 2010/0222047 A1 | 9/2010 | Vanderlinden et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0262638 A1 | 10/2010 | Fitzgerald |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0291898 A1 | 11/2010 | Sanding et al. |
| 2010/0299313 A1 | 11/2010 | Orsini et al. |
| 2010/0306353 A1 | 12/2010 | Briscoe et al. |
| 2010/0311404 A1 | 12/2010 | Shi et al. |
| 2010/0312794 A1 | 12/2010 | Liu |
| 2010/0318802 A1 | 12/2010 | Balakrishnan |
| 2010/0325622 A1 | 12/2010 | Morton |
| 2010/0328064 A1 | 12/2010 | Rogel |
| 2010/0332639 A1 | 12/2010 | Diaz et al. |
| 2011/0003590 A1 | 1/2011 | Yoon et al. |
| 2011/0010720 A1 | 1/2011 | Smith et al. |
| 2011/0014913 A1 | 1/2011 | Yoon et al. |
| 2011/0014948 A1 | 1/2011 | Yeh |
| 2011/0021175 A1 | 1/2011 | Florek et al. |
| 2011/0026501 A1 | 2/2011 | Sharaga et al. |
| 2011/0028138 A1 | 2/2011 | Davies-Moore et al. |
| 2011/0030062 A1 | 2/2011 | Hsu et al. |
| 2011/0035421 A1 | 2/2011 | Laird-McConnell et al. |
| 2011/0035604 A1 | 2/2011 | Habraken |
| 2011/0050713 A1 | 3/2011 | Mccrary et al. |
| 2011/0055084 A1 | 3/2011 | Singh |
| 2011/0063093 A1 | 3/2011 | Fung et al. |
| 2011/0078081 A1 | 3/2011 | Pirzadeh et al. |
| 2011/0081885 A1 | 4/2011 | Sennett et al. |
| 2011/0082711 A1 | 4/2011 | Poeze et al. |
| 2011/0112968 A1 | 5/2011 | Floreck et al. |
| 2011/0113479 A1 | 5/2011 | Ganem |
| 2011/0119716 A1 | 5/2011 | Coleman, Sr. |
| 2011/0130635 A1 | 6/2011 | Ross |
| 2011/0138064 A1 | 6/2011 | Rieger et al. |
| 2011/0138074 A1 | 6/2011 | Onda et al. |
| 2011/0145926 A1 | 6/2011 | Dalcher et al. |
| 2011/0154032 A1 | 6/2011 | Mauro, II |
| 2011/0161659 A1 | 6/2011 | Himawan et al. |
| 2011/0165836 A1 | 7/2011 | Dixon et al. |
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0208338 A1 | 8/2011 | Eteminan et al. |
| 2011/0212707 A1 | 9/2011 | Mahalal |

(56) References Cited

U.S. PATENT DOCUMENTS

| | | |
|---|---|---|
| 2011/0216701 A1 | 9/2011 | Patel et al. |
| 2011/0222404 A1 | 9/2011 | Watson et al. |
| 2011/0226853 A1 | 9/2011 | Soh et al. |
| 2011/0230136 A1 | 9/2011 | Washiro |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0258249 A1 | 10/2011 | Biggs et al. |
| 2011/0258462 A1 | 10/2011 | Robertson et al. |
| 2011/0263294 A1 | 10/2011 | Kim et al. |
| 2011/0276677 A1 | 11/2011 | Osuga et al. |
| 2011/0281558 A1 | 11/2011 | Winter |
| 2011/0294418 A1 | 12/2011 | Chen |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0027059 A1 | 2/2012 | Zhao et al. |
| 2012/0028575 A1 | 2/2012 | Chen et al. |
| 2012/0029997 A1 | 2/2012 | Khan et al. |
| 2012/0036282 A1 | 2/2012 | Chen et al. |
| 2012/0036347 A1 | 2/2012 | Swanson et al. |
| 2012/0040662 A1 | 2/2012 | Rahman et al. |
| 2012/0046022 A1 | 2/2012 | Kalke et al. |
| 2012/0047227 A1 | 2/2012 | Haggerty et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0094684 A1 | 4/2012 | Reddy |
| 2012/0102202 A1 | 4/2012 | Omar |
| 2012/0106509 A1 | 5/2012 | Klingenbrunn et al. |
| 2012/0115433 A1 | 5/2012 | Young et al. |
| 2012/0123868 A1 | 5/2012 | Brudnicki et al. |
| 2012/0129513 A1 | 5/2012 | van der Laak |
| 2012/0129572 A1 | 5/2012 | Johnstone et al. |
| 2012/0130839 A1 | 5/2012 | Koh et al. |
| 2012/0131178 A1 | 5/2012 | Zhu et al. |
| 2012/0135733 A1 | 5/2012 | Cormier et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0150601 A1 | 6/2012 | Fisher |
| 2012/0154413 A1 | 6/2012 | Kim et al. |
| 2012/0158467 A1 | 6/2012 | Hammad et al. |
| 2012/0158580 A1 | 6/2012 | Eram et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0203824 A1 | 8/2012 | Oommen |
| 2012/0207165 A1 | 8/2012 | Davis |
| 2012/0208511 A1 | 8/2012 | Vanderlinden et al. |
| 2012/0226582 A1 | 9/2012 | Hammad |
| 2012/0226772 A1 | 9/2012 | Grube et al. |
| 2012/0230587 A1 | 9/2012 | Arseneau |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0260095 A1 | 10/2012 | Von Hauck et al. |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0276872 A1 | 11/2012 | Knauth et al. |
| 2012/0282891 A1 | 11/2012 | Mohammed et al. |
| 2012/0282924 A1* | 11/2012 | Tagg et al. ............... 455/432.1 |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2013/0014259 A1 | 1/2013 | Gribble et al. |
| 2013/0023235 A1 | 1/2013 | Fan et al. |
| 2013/0031191 A1 | 1/2013 | Bott |
| 2013/0031234 A1 | 1/2013 | Alfano et al. |
| 2013/0034081 A1 | 2/2013 | Ban et al. |
| 2013/0035056 A1 | 2/2013 | Prasad et al. |
| 2013/0046951 A1 | 2/2013 | Jones |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0065578 A1 | 3/2013 | Raleigh et al. |
| 2013/0067552 A1 | 3/2013 | Hawkes et al. |
| 2013/0072168 A1 | 3/2013 | Colucciello et al. |
| 2013/0085914 A1 | 4/2013 | McPherson et al. |
| 2013/0086385 A1 | 4/2013 | Poeluev |
| 2013/0086684 A1 | 4/2013 | Mohler |
| 2013/0097302 A9 | 4/2013 | Khedouri et al. |
| 2013/0109307 A1 | 5/2013 | Reisgies et al. |
| 2013/0111095 A1 | 5/2013 | Mehrotra et al. |
| 2013/0111461 A1 | 5/2013 | Zubas et al. |
| 2013/0117186 A1 | 5/2013 | Weinstein et al. |
| 2013/0124583 A1 | 5/2013 | Ferguson et al. |
| 2013/0125114 A1 | 5/2013 | Frascadore |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0191632 A1 | 7/2013 | Spector et al. |
| 2013/0198567 A1 | 8/2013 | Ahmed et al. |
| 2013/0212704 A1 | 8/2013 | Shablygin et al. |
| 2013/0222395 A1 | 8/2013 | Blas, Jr. |
| 2013/0262264 A1 | 10/2013 | Karstoft |
| 2013/0263212 A1 | 10/2013 | Faltyn et al. |
| 2013/0290709 A1 | 10/2013 | Muppidi et al. |
| 2013/0303142 A1 | 11/2013 | Burcham et al. |
| 2013/0305333 A1 | 11/2013 | Katzer et al. |
| 2013/0310003 A1* | 11/2013 | Sadhvani et al. ............ 455/411 |
| 2013/0311836 A1 | 11/2013 | Hurst et al. |
| 2013/0332456 A1 | 12/2013 | Arkin |
| 2013/0343181 A1 | 12/2013 | Stroud et al. |
| 2013/0345530 A1 | 12/2013 | McRoberts et al. |
| 2013/0347103 A1 | 12/2013 | Veteikis et al. |
| 2014/0045483 A1 | 2/2014 | Whidden |
| 2014/0047548 A1 | 2/2014 | Bye et al. |
| 2014/0059642 A1 | 2/2014 | Deasy et al. |
| 2014/0074508 A1 | 3/2014 | Ying et al. |
| 2014/0080467 A1 | 3/2014 | Urbanek |
| 2014/0089243 A1 | 3/2014 | Oppenheimer |
| 2014/0089699 A1 | 3/2014 | O'Connor et al. |
| 2014/0104287 A1 | 4/2014 | Nalluri et al. |
| 2014/0106709 A1 | 4/2014 | Palamara et al. |
| 2014/0113610 A1 | 4/2014 | Ramprasad et al. |
| 2014/0155025 A1 | 6/2014 | Parker et al. |
| 2014/0173747 A1 | 6/2014 | Govindaraju |

(56) References Cited

U.S. PATENT DOCUMENTS

| | | |
|---|---|---|
| 2014/0188738 A1 | 7/2014 | Huxham |
| 2014/0206313 A1 | 7/2014 | Spanel et al. |
| 2014/0228012 A1 | 8/2014 | Annan et al. |
| 2014/0228042 A1 | 8/2014 | Annan et al. |
| 2014/0245444 A1 | 8/2014 | Lutas et al. |
| 2014/0254381 A1 | 9/2014 | Racz et al. |
| 2014/0267332 A1 | 9/2014 | Chhabra et al. |
| 2014/0274032 A1 | 9/2014 | Shipley et al. |
| 2014/0279558 A1 | 9/2014 | Kadi et al. |
| 2014/0281544 A1 | 9/2014 | Paczkowski et al. |
| 2014/0373184 A1 | 12/2014 | Mahaffey et al. |
| 2015/0065105 A1 | 3/2015 | Masterson et al. |
| 2015/0111564 A1 | 4/2015 | Urbanek |
| 2015/0111565 A1 | 4/2015 | Urbanek |

FOREIGN PATENT DOCUMENTS

| | | |
|---|---|---|
| WO | 2013170228 A2 | 11/2013 |
| WO | WO2013169983 A1 | 11/2013 |
| WO | 2014004590 A2 | 1/2014 |
| WO | 2014018575 A2 | 1/2014 |
| WO | 2014025687 A2 | 2/2014 |
| WO | WO2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 9/2014 |
| WO | WO2014158431 A1 | 10/2014 |
| WO | WO2015030945 A1 | 3/2015 |
| WO | WO2015060965 A2 | 4/2015 |

OTHER PUBLICATIONS

Notice of Allowance dated Feb. 5, 2015, U.S. Appl. No. 13/533,969, filed Jun. 27, 2012.
Office Action dated Dec. 15, 2014, U.S. Appl. No. 13/571,348, filed Aug. 10, 2012.
Restriction Requirement dated Jan. 2, 2015, U.S. Appl. No. 13/762,319, filed Feb. 7, 2013.
FAIPP Pre-Interview Communication dated Feb. 12, 2015, U.S. Appl. No. 14/066,661, filed Oct. 29, 2013.
Notice of Allowance dated Dec. 3, 2014, U.S. Appl. No. 13/594,777, filed Aug. 25, 2012.
First Action Interview Office Action dated Dec. 3, 2014, U.S. Appl. No. 13/594,779, filed Aug. 25, 2012.
Notice of Allowance dated Feb. 26, 2015, U.S. Appl. No. 13/786,450, filed Mar. 5, 2013.
FAIPP Pre-Interview Communication dated Dec. 16, 2014, U.S. Appl. No. 13/898,435, filed May 20, 2013.
Notice of Allowance dated Feb. 20, 2015, U.S. Appl. No. 13/898,435, filed May 20, 2013.
Notice of Allowance dated Dec. 19, 2014, U.S. Appl. No. 13/844,325, filed Mar. 15, 2013.
Notice of Allowance dated Jan. 2, 2015, U.S. Appl. No. 13/831,463, filed Mar. 14, 2013.
FAIPP Pre-Interview Communication dated Feb. 4, 2015, U.S. Appl. No. 14/075,663, filed Nov. 8, 2013.
FAIPP Pre-Interview Communication dated Feb. 25, 2015, U.S. Appl. No. 14/163,047, filed Jan. 24, 2014.
Restriction Requirement dated Jan. 5, 2015, U.S. Appl. No. 13/857,139, filed Apr. 4, 2013.
Foreign Communication from a Related Counterpart—International Preliminary Report on Patentability, dated Jan. 8, 2015, PCT/US13/47729, filed on Jun. 25, 2013.
Foreign Communication from a Related Counterpart—International Preliminary Report on Patentability, dated Feb. 19, 2015, PCT/US13/53617, filed on Aug. 5, 2013.
Foreign Communication from a Related Counterpart—International Preliminary Report on Patentability, dated Feb. 5, 2015, PCT/US13/51750, filed on Jul. 24, 2013.
Katzer, Robin D., et al., "Web Server Bypass of Backend Process on Near Field Communications and Secure Elements Chips", filed Feb. 26, 2015, U.S. Appl. No. 14/632,850.
Neson, Tracy L., et al., "Mated Universal Serial Bus (USB) Wireless Dongles Configured with Destination Addresses", filed Jan. 26, 2015, U.S. Appl. No. 14/606,011.
Paczkowski, Lyle W., et al., "Trusted Code Generation and Verification to Prevent Fraud from Maleficent External Devices that Capture Data", filed Jan. 14, 2015, U.S. Appl. No. 14/592,218.
FAIPP Pre-Interview Communication dated Mar. 20, 2014, U.S. Appl. No. 13/482,731, filed May 29, 2012.
Notice of Allowance dated May 27, 2014, U.S. Appl. No. 13/482,731, filed May 29, 2012.
FAIPP Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
Final Office Action dated Sep. 9, 2013, U.S. Appl. No. 13/440,980, filed Apr. 5, 2012.
Notice of Allowance dated Nov. 29, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Jul. 25, 2013, U.S. Appl. No. 13/470,203, filed May 11, 2012.
Final Office Action dated Mar. 27, 2014, U.S. Appl. No. 13/470,203, filed May 11, 2012.
Advisory Action dated May 29, 2014, U.S. Appl. No. 13/470,203, filed May 11, 2012.
FAIPP Pre-Interview Communication dated May 12, U.S. Appl. No. 13/294,177, filed Nov. 11, 2011.
FAIPP Pre-Interview Communication dated Jun. 6, 2013, U.S. Appl. No. 13/571,348, filed Aug. 10, 2012.
Office Action dated Sep. 25, 2013, U.S. Appl. No. 13/571,348, filed Aug. 10, 2012.
Final Office Action dated Apr. 10, 2014, U.S. Appl. No. 13/571,348, filed Aug. 10, 2012.
Advisory Action dated Jun. 23, 2014, U.S. Appl. No. 13/571,348, filed Aug. 10, 2012.
Notice of Allowance dated Aug. 30, 2013; U.S. Appl. No. 13/540,437, filed Jul. 2, 2012.
Restriction Requirement dated Nov. 1, 2013, U.S. Appl. No. 13/557,213, filed Jul. 25, 2012.
Office Action dated Dec. 19, 2013, U.S. Appl. No. 13/557,213, filed Jul. 25, 2012.
Notice of Allowance dated Jun. 4, 2014, U.S. Appl. No. 13/557,213, filed Jul. 25, 2012.
FAIPP Pre-Interview Communication dated Nov. 27, 2013, U.S. Appl. No. 13/610,856, filed Sep. 11, 2012.
Notice of Allowance date Jan. 31, 2014, U.S. Appl. No. 13/610,856, filed Sep. 11, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
Notice of Allowance dated Oct. 16, 2013, U.S. Appl. No. 13/556,200, filed Jul. 24, 2012.
FAIPP Pre-Interview Communication dated Aug. 4, 2014, U.S. Appl. No. 13/844,357, filed Mar. 15, 2013.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Notice of Allowance dated Jul. 8, 2014, U.S. Appl. No. 13/802,383, filed Mar. 13, 2013.
Restriction Requirement dated Aug. 14, 2014, U.S. Appl. No. 13/594,777, filed Aug. 25, 2012.
FAIPP Pre-Interview Communication dated Jul. 17, 2014, U.S. Appl. No. 13/594,778, filed Aug. 25, 2012.

(56) References Cited

OTHER PUBLICATIONS

FAIPP Pre-Interview Communication dated Jul. 17, 2014, U.S. Appl. No. 13/594,779, filed Aug. 25, 2012.
Office Action dated May 5, 2014, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Notice of Allowance dated Jan. 28, 2014, U.S. Appl. No. 12/486,873, filed Jun. 18, 2009.
Zimmerman, Ann, "Check Out the Future of Shopping", The Wall Street Journal, Business, May 18, 2011, http://online.wsj,com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Foreign Communication from a Related Counterpart—International Search Report and Written Opinion, dated Dec. 2, 2013, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Search Report and Written Opinion, dated Feb. 4, 2014, PCT/US13/51750, filed on Jul. 24, 2013.
Foreign Communication from a Related Counterpart—International Search Report and Written Opinion, dated Apr. 22, 2014, PCT/US13/53617, filed on Aug. 5, 2013.
Ahmed, Farid, et al., "Correlation-based Watermarking Method for Imagine Authentication Applications", Society of Photo-Optical Instrumentation Engineers, Feb. 17, 2004, pp. 1834-1838.
Foreign Communication from a Related Counterpart—International Search Report and Written Opinion, dated Jul. 11, 2014, PCT/US14/16651, filed on Feb. 16, 2014.
Cope, Warren B., et al., "Electronic Purchase Transaction Trust Infrastructure", filed May 29, 2012, U.S. Appl. No. 13/482,731.
Katzer, Robin D., et al., "Secure Placement of Centralized Media Controller Application in Mobile Access Terminal", filed Nov. 11, 2011, U.S. Appl. No. 13/294,177.
Paczkowski, Lyle W., et al., "Trusted Policy and Charging Enforcement Function", filed Jun. 27, 2012, U.S. Appl. No. 13/533,969.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Nov. 26, 2013, U.S. Appl. No. 14/090,667.
Katzer, Robin D., et al., "Trusted Access to Third Party Applications Systems and Methods", filed Jul. 25, 2012, U.S. Appl. No. 13/557,213.
Paczkowski, Lyle W., et al., "Trusted Security Zone Access to Peripheral Devices", filed Jan. 6, 2014, U.S. Appl. No. 14/148,714.
Paczkowski, Lyle W., et al., Enablement of a Trusted Security Zone Authentication for Remote Mobile Device Management Systems and Methods, filed Mar. 15, 2013, U.S. Appl. No. 13/844,357.

Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Bertz, Lyle T., et al., "Framework for Real-Time Brokering of Digital Content Delivery," filed Aug. 25, 2012, U.S. Appl. No. 13/594,777.
Bertz, Lyle T., et al.,"Reservations in Real-Time Brokering of Digital Content Delivery," filed Aug. 25, 2012, U.S. Appl. No. 13/594,778.
Bertz, Lyle T., et al., "File Retrieval in Real-Time Brokering of Digital Content Delivery," filed Aug. 25, 2012, U.S. Appl. No. 13/594,779.
Paczkowski, Lyle W., et al., "Trusted Security Zone Watermark", filed Mar. 5, 2013, U.S. Appl. No. 13/786,450.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Kunkel, Philip M., et al., "Secure Peer-to-Peer Call Forking Facilitated by Trusted 3rd Party Voice Server Provisioning", filed Oct. 29, 2013, U.S. Appl. No. 14/066,661.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Trusted Security Zone Containers for the Protection and Confidentiality of Trusted Service Manager Data", filed Mar. 14, 2013, U.S. Appl. No. 13/831,463.
Paczkowski, Lyle W., et al., "Trusted Security Zone Containers for the Protection and Confidentiality of Trusted Service Manager Data", filed Feb. 16, 2014, PCT Application No. PCT/US14/16651.
Paczkowski, Lyle W., et al., "Verifying Applications Using a Trusted Security Zone", filed Aug. 12, 2013, U.S. Appl. No. 13/964,112.
Bye, Stephen James, et al., "Delivering Digital Content to a Mobile Device via a Digital Rights Clearing House", filed Apr. 10, 2013, U.S. Appl. No. 13/860,338.
Paczkowski, Lyle W., et al., "Trusted Processing Location Within a Graphics Processing Unit", filed Jul. 10, 2013, U.S. Appl. No. 13/939,175.
McCracken, Billy Gene, Jr., et al. "Mobile Communication Device Profound Identity Brokering Framework", filed Jun. 6, 2013, U.S. Appl. No. 13/912,190.
Krieger, Michael D., et al., "Billing Varied Service Based on Tier", filed Nov. 8, 2013, U.S. Appl. No. 14/075,663.
Paczkowski, Lyle W., et al., "Trusted Display and Transmission of Digital Ticket Documentation", filed Jan. 24, 2014, U.S. Appl. No. 14/163,047.
Loman, Clint H., et al., "Verification of Mobile Device Integrity During Activation", filed Mar. 28, 2014, U.S. Appl. No. 14/229,532.
Paczkowski, Lyle W., et al., "Network Based Temporary Trust Extension to a Remote or Mobile Device Enabled via Specialized Cloud Services", filed Jul. 29, 2014, U.S. Appl. No. 14/446,330.
Cordes, Kevin R., et al., "Digest of Biographical Information for an Electronic Device with Static and Dynamic Portions", filed Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed Apr. 4, 2013, U.S. Appl. No. 13/857,139.

(56) References Cited

OTHER PUBLICATIONS

Cordes, Kevin R., et al., "System for Managing a Digest of Biographical Information Stored in a Radio Frequency Identity Chip Coupled to a Mobile Communication Device", filed Apr. 4, 2013, U.S. Appl. No. 13/857,138.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
Notice of Allowance dated Jun. 11, 2013, U.S. Appl. No. 13/752,386, filed Jan. 28, 2013.
First Action Interview Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Notice of Allowance dated Aug. 9, 2013, U.S. Appl. No. 13/149,505, filed May 31, 2013.
First Action Interview Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
First Action Interview Pre-Interview Communication dated Apr. 23, 2014, U.S. Appl. No. 13/622,234, filed Sep. 18, 2012.
Final Office Action dated Sep. 19, 2014, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Jul. 16, 2014, U.S. Appl. No. 13/744,861, filed Jan. 18, 2013.
First Action Interview Pre-Interview Communication dated Apr. 3, 2014, U.S. Appl. No. 13/763,434, filed Feb. 8, 2013.
Final Office Action dated Aug. 19, 2014, U.S. Appl. No. 13/763,434, filed Feb. 8, 2013.
Office Action dated Aug. 7, 2014, U.S. Appl. No. 13/831,504, filed Mar. 14, 2013.
Foreign Communication from a Related Counterpart—International Search Report and Written Opinion, dated Feb. 29, 2012, PCT/US2011/063736, filed on Dec. 7, 2011.
Foreign Communication from a Related Counterpart Application, "Preliminary Report on Patentability", dated Jun. 20, 2013, PCT/US2011/063736 filed on Dec. 7, 2011.
Foreign Communication from a Related Counterpart—International Search Report and Written Opinion, dated Jul. 24, 2013, PCT/US13/40278, filed on May 9, 2013.
Foreign Communication from a Related Counterpart—International Search Report and Written Opinion, dated Nov. 14, 2013, PCT/US13/55023, filed on Aug. 15, 2013.
Foreign Communication From a Related Counterpart Application, International Search Report and Written Opinion dated Jan. 24, 2014, International Application No. PCT/US13/68981 filed on Nov. 7, 2013.
Foreign Communication from a Related Counterpart—International Search Report and Written Opinion, dated May 19, 2014, PCT/US14/13936, filed on Jan. 30, 2014.
Foreign Communication from a Related Counterpart—International Search Report and Written Opinion, dated May 14, 2014, PCT/US14/13939, filed on Jan. 30, 2014.
Delker, Jason R., "Loading Branded Media Outside System Partition", filed Oct. 30, 2013 U.S. Appl. No. 14/066,947.
Mauer, Brian D., et al., "Automatic Branding of Generic Applications", filed Jan. 10, 2013, U.S. Appl. No. 14/152,627.
Spanel, Robert L., et al., Patent Application entitled "Dynamic Remotely Managed SIM Profile" U.S. Appl. No. 13/744,847, filed Jan. 18, 2013.
Annan, Brandon C., et al.,"System and Method of Branding and Labeling a Mobile Device", filed Mar. 15, 2013, U.S. Appl. No. 13/844,104.
Annan, Brandon C., et al.,"Electronic Fixed Brand Labeling", filed Feb. 8, 2013, U.S. Appl. No. 13/763,443.
Ghoshal, Jagannath, et al.,"Rebranding a Portable Electronic Device While Maintaining User Data", filed May 22, 2013, U.S. Appl. No. 13/899,567.
Ghoshal, Jagannath, et al.,"System and Method for Retrofitting a Branding Framework into a Mobile Communication Device", filed May 21, 2013, U.S. Appl. No. 13/899,566.
Urbanek, Robert E., "Delivery of Branding Content and Customizations to a Mobile Communication Device", filed Oct. 23, 2013, U.S. Appl. No. 14/060,712.
Urbanek, Robert E., "Implementation of Remotely Hosted Branding Content and Customizations", filed Oct. 23, 2013, U.S. Appl. No. 14/085,474.
Indurkar, Dhananjay, "System and Method of Branding a Device Independent of Device Activation", filed Jan. 24, 2014, U.S. Appl. No. 14/163,035.
Sumner, Bret D., "Directing Server Connection Based on Location Identifier", filed Aug. 15, 2013, U.S. Appl. No. 13/968,259.
Abou-El-Ella, Hassan, et al., "Segmented Customization Payload Delivery", filed Aug. 27, 2013, U.S. Appl. No. 14/010,518.
Sumner, Bret D., "Segmented Customization Package Within Distributed Server Architecture", filed Aug. 27, 2013, U.S. Appl. No. 14/010,522.
Masterson, Michelle E., et al., "Development and Testing of Payload Receipt by a Portable Electronic Device", filed Aug. 27, 2013, U.S. Appl. No. 14/010,523.
Masterson, Michelle E., et al., "System and Methods for Deferred and Remote Device Branding", filed Aug. 27, 2013, U.S. Appl. No. 14/010,524.
Masterson, Michelle E., et al., "System and Methods for Deferred and Remote Device Branding", filed Jul. 16, 2014, International Serial No. PCT/US14/46773.
Callan, Jeffery S., et al., "Delivery of Oversized Branding Elements for Customization", filed Nov. 6, 2013, U.S. Appl. No. 14/073,321.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipment Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297,429.
Indurkar, Dhananjay, "Activation Sequence Using Permission Based Connection to Network", filed Jan. 24, 2014, U.S. Appl. No. 14/163,041.
Ahn, Chul Jin, et al., "Customization for Preloaded Applications", filed Mar. 31, 2014, U.S. Appl. No. 14/231,718.
First Action Interview Pre-Interview Communication dated Sep. 22, 2014, U.S. Appl. No. 13/468,028, filed May 9, 2013.
Foreign Communication from a Related Counterpart—International Search Report and Written Opinion, dated Jun. 3, 2014,PCT/US14/16650, filed on Feb. 16, 2014.
Urbanek, Robert E., "Delivery of Branding Content and Customizations to a Mobile Communication Device", filed , 201, International Serial No. PCT/US14/56778.
Office Action dated Aug. 29, 2014, U.S. Appl. No. 13/470,203, filed May 11, 2012.
Notice of Allowance dated Oct. 8, 2014, U.S. Appl. No. 13/294,177, filed Nov. 11, 2011.
FAIPP Pre-Interview Communication dated Sep. 25, 2014, U.S. Appl. No. 13/533,969, filed Jun. 27, 2012.
Notice of Allowance dated Oct. 6, 2014, U.S. Appl. No. 13/844,357, filed Mar. 15, 2013.
FAIPP Pre-Interview Communication dated Nov. 12, 2014, U.S. Appl. No. 13/844,145, filed Mar. 15, 2013.
Notice of Allowance dated Sep. 19, 2014, U.S. Appl. No. 13/594,778, filed Aug. 25, 2012.
Final Office Action dated Nov. 7, 2014, U.S. Appl. No. 13/786,450, filed Mar. 5, 2013.
Notice of Allowance dated Sep. 26, 2014, U.S. Appl. No. 13/831,486, filed Mar. 14, 2013.

(56) References Cited

OTHER PUBLICATIONS

FAIPP Pre-Interview Communication dated Nov. 7, 2014, U.S. Appl. No. 13/802,404, filed Mar. 13, 2013.
FAIPP Pre-Interview Communication dated Oct. 29, 2014, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Foreign Communication from a Related Counterpart—International Preliminary Report on Patentability, dated Nov. 20, 2014, PCT/US13/40673, filed on May 10, 2013.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.
Lee, Jeremy, et al., "A Low-Cost Solution for Protecting IPs Against Scan-Based Side Channel Attacks," 24th IEEE VLSI Test Symposium. Pub. Date: 2006. http//ieeexplore.ieee.org/stamp/stamp.jsp?tp=&arnumber= 1617569.
Advisory Action dated Dec. 17, 2014, U.S. Appl. No. 13/622,234, filed Sep. 18, 2012.
Notice of Allowance dated Nov. 22, 2014, U.S. Appl. No. 13/744,861, filed Jan. 18, 2013.
First Action Interview Pre-Interview Communication dated Oct. 22, 2014, U.S. Appl. No. 13/763,428, filed Feb. 8, 2013.
Notice of Allowance dated Dec. 29, 2014, U.S. Appl. No. 13/831,504, filed Mar. 14, 2013.
First Action Interview Pre-Interview Communication dated Nov. 20, 2014, filed on May 21, 2013.
Foreign Communication from a Related Counterpart Application, "Preliminary Report on Patentability," dated Nov. 20, 2014, PCT/US13/40278 filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed Sep. 22, 2014.
Spanel, Robert L., et al., Patent Application entitled "Dynamic Remotely Managed SIM Profile" U.S. Appl. No. 14/522,586, filed Oct. 24, 2014.
Urbanek, Robert E., "Delivery of Branding Content and Customizations to a Mobile Communication Device", filed Sep. 22, 2014, International Serial No. PCT/US14/56778.
Koller, Gary D., et al., "Out of the Box Experience (OOBE) Country Choice Using Wi-Fi Layer Transmission," filed Oct. 31, 2014, U.S. Appl. No. 14/530,666.
Blinn, Benjamin P., et al. "System and Method of Efficient Mobile Device Network Brand Customization," filed Sep. 2, 2014, U.S. Appl. No. 14/475,399.
First Action Interview Office Action dated Mar. 16, 2015, U.S. Appl. No. 13/468,028, filed May 9, 2013.
Office Action dated Mar. 2, 2015, U.S. Appl. No. 13/622,234, filed Sep. 18, 2012.
FAIPP Pre-Interview Communication dated Mar. 26, 2015, U.S. Appl. No. 14/522,586, filed Oct. 24, 2014.
FAIPP Pre-Interview Communication dated Apr. 8, 2015, U.S. Appl. No. 13/844,104, filed Mar. 15, 2013.
Notice of Allowance dated Mar. 20, 2015, U.S. Appl. No. 13/763,428, filed Feb. 8, 2013.
Notice of Allowance dated Mar. 26, 2015, U.S. Appl. No. 13/763,434, filed Feb. 8, 2013.
FAIPP Pre-Interview Communication dated Mar. 12, 2015, U.S. Appl. No. 13/972,827, filed Aug. 21, 2013.
Notice of Allowance dated Jan. 22, 2015, U.S. Appl. No. 13/899,566, filed May 21, 2013.
FAIPP Pre-Interview Communication dated Mar. 4, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
FAIPP Pre-Interview Communication dated Apr. 3, 2015, U.S. Appl. No. 14/010,523, filed Aug. 27, 2013.
FAIPP Pre-Interview Communication dated Mar. 10, 2015, U.S. Appl. No. 14/010,524, filed Aug. 27, 2013.
FAIPP Pre-Interview Communication dated Apr. 8, 2015, U.S. Appl. No. 14/157,507, filed Jan. 16, 2014.
Foreign Communication from a Related Counterpart—International Preliminary Report on Patentability, dated Apr. 2, 2015, PCT/US13/55023, filed on Aug. 15, 2013.
Ghoshal, Jagannath, et al., "Multi-Step Mobile Device Initiation with Intermediate Partial Reset," filed Aug. 21, 2013, U.S. Appl. No. 13/972,827.
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
FAIPP Pre-Interview Communication dated Mar. 25, 2015, U.S. Appl. No. 13/532,588, filed Jun. 25, 2012.
FAIPP Pre-Interview Communication dated Mar. 10, 2015, U.S. Appl. No. 13/762,319, filed Feb. 7, 2013.
FAIPP Pre-Interview Communication dated May 21, 2015, U.S. Appl. No. 14/090,667, filed Nov. 26, 2013.
Final Office Action dated Apr. 7, 2015, U.S. Appl. No. 13/844,145, filed Mar. 15, 2013.
First Action Interview Office Action dated Apr. 7, 2015, U.S. Appl. No. 13/802,404, filed Mar. 13, 2013.
FAIPP Pre-Interview Communication dated Mar. 26, 2015, U.S. Appl. No. 13/939,175, filed Jul. 10, 2013.
Final Office Action dated Mar. 24, 2015, U.S. Appl. No. 13/844,282, filed Mar. 15, 2013.
FAIPP Pre-Interview Communication dated Mar. 24, 2015, U.S. Appl. No. 13/964,112, filed Aug. 12, 2013.
First Action Interview Office Action dated Apr. 10, 2015, U.S. Appl. No. 141075,663, filed Nov. 8, 2013.
Notice of Allowance dated Apr. 9, 2015, U.S. Appl. No. 14/163,047, filed Jan. 24, 2014.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Bertz, Lyle T., et al., "Framework for Real-Time Brokering of Digital Content Delivery," filed Mar. 17, 2015, U.S. Appl. No. 14/659,614.
Marquard, et al., "Infrastructure for Secure Short Message Transmission," filed Apr. 7, 2015, U.S. Appl. No. 14/681,077.
FAIPP Pre-Interview Communication dated Jun. 2, 2015, U.S. Appl. No. 14/152,627, filed Jan. 10, 2013.
Notice of Allowance dated Jul. 7, 2015, U.S. Appl. No. 14/522,586, filed Oct. 24, 2014.
FAIPP Pre-Interview Communication dated Apr. 23, 2014, U.S. Appl. No. 13/763,443, filed Feb. 8, 2013.
First Action Interview Office Action dated Jun. 16, 2014, U.S. Appl. No. 13/763,443, filed Feb. 8, 2013.
Office Action dated Jun. 16, 2015, U.S. Appl. No. 13/899,567, filed May 22, 2013.
Notice of Allowance dated May 7, 2015, U.S. Appl. No. 13/972,827, filed Aug. 21, 2013.
Notice of Allowance dated May 8, 2015, U.S. Appl. No. 14/010,518, filed Aug. 27, 2013.
Notice of Allowance dated Jul. 8, 2015, U.S. Appl. No. 14/010,522, filed Aug. 27, 2013.
Notice of Allowance dated Jun. 26, 2015, U.S. Appl. No. 14/010,523, filed Aug. 27, 2013.
Notice of Allowance dated Apr. 28, 2015, U.S. Appl. No. 14/010,524, filed Aug. 27, 2013.
Restriction Requirement dated May 21, 2015, U.S. Appl. No. 14/073,321, filed Nov. 6, 2013.
Faipp Pre-Interview Communication dated Jul. 8, 2015, U.S. Appl. No. 14/475,399, filed Sep. 2, 2014.
Amazon Kindle e-book reader, on public sale 2007, http://en.wikipedia.org/wiki/Amazon_Kindle. last accessed on Apr. 13, 2015.

\* cited by examiner

SUBSCRIBER IDENTITY MODULE VIRTUALIZATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may be configured for operating in different ways or in different network conditions by storing settings, values, or files in the device. Some of the stored settings may be one or more kinds of roaming lists, e.g., a priority ordered list of wireless systems to select and attempt to attach a wireless link to. Mobile communication devices may be used by a user as a business device, for example in support of his role as an employee of a corporation, as a personal communication device, for example in support of his role as a private individual. Mobile communication devices may be configured to work as different membership cards in different environments. Mobile communication devices may be configured or provisioned to perform machine-to-machine communication transactions, for example by a radio communication session between the mobile communication device and a door scanner such as to gain access to an office building or to a hotel room.

SUMMARY

In an embodiment, a mobile communication device is disclosed. The mobile communication device comprises a radio transceiver, a non-transitory memory integral with the mobile communication device, wherein the memory is apportioned into a plurality of partitions, and a first wireless communication identity stored in a first partition of the memory, wherein a wireless communication identity comprises a network access identity, a list of wireless communication systems to which the device is authorized to attach, a rule set for prioritizing among the wireless communication systems identified in the list, and a table of device rules. The mobile communication device further comprises a second wireless communication identity stored in a second partition of the memory, wherein the second wireless communication identity is different from the first wireless communication identity, a processor, and an application stored in the memory that, when executed by the processor, detects a triggering event and in response to the triggering event changes the active wireless communication identity of the mobile communication device to one of the wireless communication identities stored in the partitions of the memory and applies device rules associated with the wireless communication identity, where the mobile communication device conducts wireless communication via the radio transceiver based on the active communication identity and the associated device rules.

In an embodiment, a method for virtualizing a subscriber identity module (SIM) on a mobile communication device is disclosed. The method comprises allocating wireless communication identities into a secure portion of a memory of the mobile communication device, storing each wireless communication identity into a single partition in the memory of the mobile communication device, detecting a triggering event, and activating or dynamically installing and activating one of the wireless communication identities stored in the partitions of the memory in response to the triggering event, where the mobile communication device conducts wireless communication via the radio transceiver based on the active communication identity.

In an embodiment, a method of virtualizing a subscriber identity module on a mobile communication device is disclosed. The method comprises allocating and storing one wireless communication identity into a single partition in a memory of the mobile communication device, storing wireless communication configurations associated with each wireless communication identity into the corresponding partition of the memory on the mobile communication device, and storing device rules associated with each wireless communication identity into the corresponding partition of the memory on the mobile communication device. The method further comprises sending the wireless communication identity, corresponding wireless communication configurations, device rules, and/or associated user data to a remote server and fetching the wireless communication identity, corresponding wireless communication configurations, device rules, and/or associated user data from the remote server under predefined circumstances.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
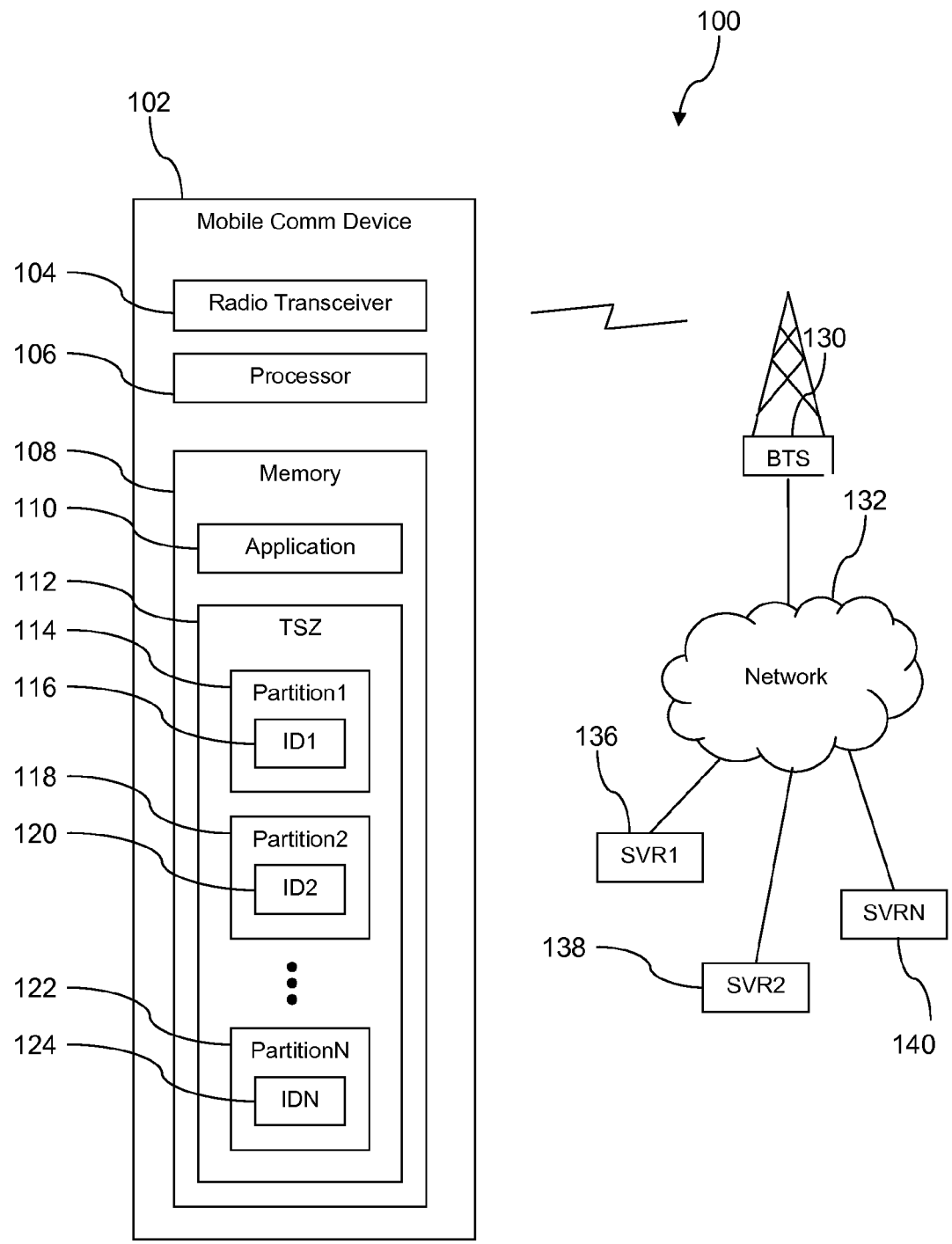
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Problems may be caused by a mobile communication device that is associated with one single wireless communication identity while the user desires more than one wireless communication identity—for example the ability to smoothly switch among different wireless communication identities. The problems may result from the physical subscriber identity module (SIM) cards. For example, a current subscriber identity module card contains one wireless communication identity. When a user desires different wireless communication identities with different wireless carriers, different locations, different user preferences, or different services, a single subscriber identity module card with a single wireless communication identity may not be satisfactory. The present disclosure teaches a system and method for installing wireless communication identities into a virtualized subscriber identity module on the mobile communication device and activating certain wireless communication identity under predefined circumstances.

For example, wireless communication identities may be allocated and stored into different partitions of a secure portion in a memory of a mobile communication device through an application on the mobile communication device. One wireless communication identity is installed into a single partition of the memory. When a triggering event is detected by the application on the mobile communication device, an optimal or preferred wireless communication identity is selected and activated. A triggering event may be user input, the change of locations, the change of wireless communication services providers, a radio signal incident, a scheduled event, or another triggering event. The application may redetermine or recalculate operational run-time parameters of the mobile communication device based on the activated wireless communication identity and store these operational run-time parameters in the memory of the mobile communication device. The application may reset the radio transceiver to bring into effect the recalculated operational run-time parameters. The application may then update the user data associated with the wireless communication identity, for example user preferences, service enrollment, application enablement, customization parameters, and/or a contact list. Corresponding applications may then operate with updated user data afterwards.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. patent application Ser. No. 13/532,588, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a communication system is described. In an embodiment, the system 100 comprises a plurality of mobile communication devices 102. The mobile communication device 102 may comprise a radio transceiver 104, a processor 106, and a memory 108. The memory 108 may comprise an application 110 and a trusted security zone 112 that may be apportioned into a plurality of partitions, a first partition 114, a second partition 118, a third partition 122, or any number of other partitions. Each partition may comprise a wireless communication identity, for example the first partition 114 with a first wireless communication identity 116, the second partition 118 with a second wireless communication identity 120, the third partition 122 with a third wireless communication identity 124, or any number of other partitions, with another corresponding wireless communication identity. The mobile communication device 102 is configured to use the radio transceiver 104 to establish a wireless communication link with a base transceiver station (BTS) 130, and the base transceiver station 130 provides communications connectivity of the mobile communication device 102 to a network 132. A first server 136, a second server 138, and a third server 140, or any number of other servers, may also have access to the network 132. The network may comprise any combination of private and public networks.

It is understood that the system 100 may comprise any number of mobile communication devices 102 and any number of base transceiver stations 130. The collectivity of base transceiver stations 130 may be said to comprise a radio access network, in that these base transceiver stations 130 may provide a radio communication link to the mobile communication devices 102 to provide access to the network 132. The radio access network may be abstracted in different ways and may comprise, in addition to the base transceiver stations 130, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication devices 102.

The radio transceiver 104 may communicate with the base transceiver station 130 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The mobile communication device 102 may be any of a mobile phone, a personal digital assistant (PDA), a media player, a wireless enabled computer, or other mobile communication device. In an embodiment, the mobile communication device 102 may have other components (not shown) such as a near field communication (NFC) radio transceiver, a wireless local area network (WLAN) radio transceiver, or other components.

In an embodiment, the trusted security zone 112 is more than just a segment of memory. The trusted security zone 112 may also have a dimension of processing. The trusted security zone 112 may provide the secure execution environment for trusted applications where only trusted applications may operate, safe from attacks. The trusted security zone 112 may be implemented by partitioning both hardware and software resources of the mobile communication device 102 into two segments: a secure portion/segment and a normal portion/segment. The secure segment may be implemented by a distinct, separate, or dedicated physical processor, usually the first processor, from the processor by which the normal segment may be implemented, usually the second processor. Alternatively, the secure segment may be implemented by a distinct, separate, or dedicated virtual processor from the virtual processor by which the normal segment may be implemented. In an embodiment, the hardware segmentation of the trusted security zone 112 and the software installation of the trusted security zone 112 may enable a trusted execution environment on the mobile communication device 102. The trusted execution environment may be included/integrated within an application processor on the mobile communication device 102 at the chip manufacturer.

The trusted security zone 112 may be apportioned into different partitions to store wireless communication identities. The partitions may not necessarily be created inside the trusted security zone 112 as shown in FIG. 1. In an embodiment, the partitions to store wireless communication identities may be created within a secure part of the mobile communication device 102. For example, a physical subscriber identity module card may be apportioned into partitions to store the wireless communication identities. As another example, a memory of the mobile communication device may be apportioned into partitions to store the wireless communication identities. The limit of the maximum number of partitions to store the wireless communication identities may be determined by the total memory allocated for the wireless communication identities. The memory allocated for the wireless communication identities may comprise internal memory and file memory. Partitions are not necessarily pieces of memory of the same size. Alternatively, partitions for different wireless communication identities may be of different sizes. For example, the first partition 114 may be larger in size than the second partition 118, and the third partition 122 may be the smallest in size among the three partitions 114, 118, and 122.

In an embodiment, the trusted security zone 112 may not be present, and a memory of the mobile communication device 102 may be used to store the multiple virtual subscriber identity modules. In an embodiment, the multiple virtual subscriber identity modules may be stored in a carrier partition of the memory of the mobile communication device 102. In an embodiment, the carrier partition of memory of the mobile communication device 102 may be sub-divided into a plurality of sub-partitions, each sub-partition allocated for a different virtual subscriber identity module. The carrier memory partition may be provided by the operating system of the mobile communication device 102. For example, the operating system may restrict access to a system memory partition exclusively to users providing a system memory partition password, for example a system password known to an original equipment manufacturer of the mobile communication device 102; the operating system may restrict access to the carrier memory partition exclusively to users providing a carrier memory partition password, for example a carrier password known to a telecommunications service carrier; and the operating system may allow access to a user memory partition substantially without restriction.

Access to the trusted security zone 112 may be contingent on providing a master trusted security zone key, for example access to configure or add trusted security zone partitions. Access to configured trusted security zone partitions 114, 118, 122 may be authorized by presenting an access key, for example a sub-zone key or a trusted security zone partition key associated with the subject trusted security zone partition. Said in other words, a first sub-zone key may be used to authorize access to the first trusted security zone partition 114, a second sub-zone key may be used to authorize access to the second trusted security zone partition 118, and a third sub-zone key may be used to authorize access to the third trusted security zone partition 122. The first sub-zone key, the second sub-zone key, and the third sub-zone key may each be different from each other. For more details on trusted security zone segments and sub-zone keys, see U.S. patent application Ser. No. 13/571,348, filed Aug. 10, 2012, entitled "Systems and Methods for Provisioning and Using Multiple Trusted Security Zones on an Electronic Device," by Stephen J. Bye, et al., which is hereby incorporated by reference in its entirety.

In an embodiment, the first trusted security zone partition 114 may store a first wireless communication identity 116, the second trusted security zone partition 118 may store a second wireless communication identity 120, and the third trusted security zone partition 122 may store a third wireless communication identity 124. The wireless communication identities 116, 120, 124 may be referred to as the first ID 116, the second ID 120, and the third ID 124. While the description below is written based on an implementation using the trusted security zone 112, it is understood that the teachings of the present disclosure may also be used for wireless communication identities stored in partitions or in portions of memory outside of a trusted security zone.

A wireless communication identity, for example the first wireless communication identity 116, the second wireless communication identity 120, or the third wireless communication identity 124 may be a personal wireless communication identity, a business wireless communication identity, a production wireless communication identity, a testing wireless communication identity, wireless communication identities for different wireless communication providers, wireless communication identities for different reward membership, a wireless communication identity for a mobile wallet, or another wireless communication identity. For example, a personal wireless communication identity may be activated when personal wireless communication is desired on the mobile communication device 102 and a business wireless communication identity may be activated when business wireless communication is desired on the mobile communication device 102. A testing wireless communication identity may be activated on the mobile communication device 102 in a testing environment and a production wireless communication identity may be activated on the mobile communication device 102 in a production environment so that no specific testing mobile communication devices different from production devices may need to be purchased. Additionally, a wireless communication identity associated with a wireless communications service provider may be activated on the mobile communication device 102 when the wireless communications service is preferred, and another wireless communication identity associated with another wireless communications service provider may be activated on the mobile communication device 102 when the other wireless communications service is preferred.

The wireless communication identity 116, 120, 124 comprises information that promotes conducting wireless communications. The wireless communication identity comprises a network access identity. The network access identity may take any form, but in an embodiment the network access identity comprises a code that identifies a country and a code that identifies a wireless network and/or a wireless service provider. For example, in a code division multiple access (CDMA) implementation, the network access identity may comprise a mobile network code (MNC) and a mobile country code (MCC). Alternatively, in a long-term evolution (LTE) implementation, the network access identity may comprise a public land mobile network identity (PLMN ID) that comprises a country code and a network code. The network access identity may be used to authorize access of the mobile communication device 102 to the wireless link provided by the base transceiver station 130 and/or to the network 132.

The wireless communication identity 116, 120, 124 further comprises information that may be used to generate operational run-time parameters for wireless communication. The information may comprise one or more lists of wireless communication networks that the mobile communication device 102 is authorized to attach to, a rule set for prioritizing among the networks identified in the one or more lists, and one or more tables of device rules.

The lists of wireless communication networks that the mobile communication device 102 is authorized to attach to may depend on the wireless communication protocol used by the mobile communication device 102 to establish a wireless link to the base transceiver station 130. Said in another way, the particular lists—the number of lists and the names of lists—of wireless communication networks may be different for mobile communication devices 102 communicating according to different wireless communication protocols. The lists of wireless communication networks may comprise one or more of a PRL, a PLMN list, an OPLMN list, an EHPLMN list, an HPLMN list, an MSPL table, and an MLPL table.

PRL stands for a preferred roaming list. The PRL may comprise information used in network and/or system selection and acquisition. The PRL may organize the information in prioritized order, for example defining what systems and/or service provider identities to scan and in what order to obtain radio access. PLMN stands for public land mobile network. The PLMN list may comprise a list of public land mobile networks and/or other lists, such as an EHPLMN list or an OPLMN list. The HPLMN list is a home PLMN file that may comprise a list of networks or communication systems identified by mobile country code (MCC). EHPLMN stands for an equivalent home PLMN. The EHPLMN list may comprise records of networks or communication systems identified by Mobile Country Code (MCC). OPLMN stands for operator controlled PLMN. The OPLMN list may comprise records of networks or communication systems identified by Mobile Network Code (MNC). MSPL stands for MMSS (multimode system selection) System Priority List. The MSPL table may be used with another system selection priority list (e.g., PLMN list, OPLMN list, HPLMN list, EHPLMN list, and the like). MLPL stands for MMSS Location Associated Priority List. The MLPL table may enable scaling a range of entries of a system selection priority list (e.g., PLMN list, OPLMN list, HPLMN list, EHPLMN list, and the like).

These lists and/or tables may be said to implement, define, and/or describe a coverage map. In an embodiment, the MSPL and the MLPL lists or tables may provide geocoding and preference information and may promote mapping between 3GPP and 3GPP2 protocols. The tables of device rules may comprise a band support table and a technology order table. The band support table may identify ranges of radio frequency that the mobile communication device 102 should scan for attaching to the radio access network (RAN), for example to attach to the base transceiver station 130. In an embodiment, the six lists and the two tables may be compiled and/or reformatted to efficiently combine the content as a list or table at run-time on the mobile communication device 102, for example on the event of a modem reset.

In an embodiment, the IDs 116, 120, 124 may comprise addresses of alternative domain name server (DNS) servers, media gateways, ports, and/or routing information. The IDs 116, 120, 124 may share information in common but do differ by at least one parameter value. One or more of the IDs 116, 120, 124 may be stored in a single memory chip or a plurality of memory chips. One or more of the IDs 116, 120, 124 may be stored in different virtual memories or in different segments of memory that are managed as separate virtual memories by an operating system and/or by a virtualization application on the mobile communication device 102. One or more of the IDs 116, 120, 124 may be stored in an integrated memory such as a memory of a stand-alone chipset or a non-transitory memory integral with the mobile communication device. One or more of the IDs 116, 120, 124 may be stored in a removable memory card such as a secure digital (SD) card or a physical subscriber identity module card.

Additionally, the IDs 116, 120, or 124 may comprise user data associated with the wireless communication identities, for example user preferences, service enrollment, application enablement, customization parameters, a contact list, and/or other user data associated with the wireless communication identity. For example, a business ID may prefer standard resolution and regular content movie while a personal ID may prefer high resolution and premium content movie in terms of movie shopping preferences. A personal ID may enable a specific game application or all game applications while a business ID may disable the specific game application or all game applications. An ID for a certain wireless communications service provider may have a contact list different form an ID for another wireless communications service provider. A first hotel reward program ID may comprise reward information specific to the corresponding first hotel while a second reward program ID for another hotel may comprise reward information for the second hotel. An ID may set a different theme on the mobile communication device from another ID.

The IDs 116, 120, 124 may be sourced from different sources, for example the first ID 116 may be sourced or provided by the first server 136, the second ID 120 may be sourced by the second server 138, and the third ID 124 may be sourced by the third server 140. Alternatively, two or more IDs may be sourced from a single server. An ID broker may interwork with the severs 136, 138, and/or 140 to mediate the transport of the subject ID 116, 120, 124 to the mobile communication device 102. In an embodiment, the ID broker may arrange transport of the subject ID 116, 120, 124 to the trusted security zone 112 of the mobile communication device 102 over a trusted end-to-end communication link. For more details on establishing trusted end-to-end communication links relying on hardware assisted security, see U.S. patent application Ser. No. 13/532,588, filed Jun. 25, 2012, entitled "End-to-end Trusted Communications Infrastructure," by Leo Michael McRoberts, et al., which was incorporated by reference above. In some contexts, the ID broker may be said to implement multi-identity management brokering as a network service.

In an embodiment, the IDs 116, 120, 124 may be installed in different ways. For example, the IDs 116, 120, 124 may be allocated and installed remotely by a server at the time of fulfillment or activation of the mobile communication device 102. The IDs 116, 120, 124 may be allocated and stored at the manufacturer of the mobile communication device 102 when the manufacturer of the mobile communication device 102 knows where the mobile communication device will be shipped to and/or what IDs 116, 120, 124 the mobile communication device will be equipped with. The IDs 116, 120, 124 may then be installed by the application 110 at the time of the fulfillment or activation of the mobile communication device 102. The IDs 116, 120, 124 may be installed locally by the application 110 at the time of ID change with data preloaded earlier. Additionally, the IDs 116, 120, 124 may be dynamically allocated and installed by the application 110 at the time of ID change.

For example the first ID 116 may be installed by the first server 136 remotely at the time of fulfillment or activation of the mobile communication device 102. The data of the second ID 120 may be downloaded to the mobile communication device 102 and the second ID 120 may be installed locally by the application 110 at the time of fulfillment or activation of the mobile communication device 102. And the data of the third ID 124 may be downloaded and stored locally without installing at the time of fulfillment or activation of the mobile communication device 102. Alternatively, the third ID 124 may be installed locally by the application 110 when the active ID is changed from another ID to the third ID 124. When the application 110 activates a different wireless communication identity 116, 120, 124, the application 110 may then distribute configuration parameters associated with the activated wireless communication identity. In an embodiment, the configuration parameters may comprise internal memory and file memory assigned to the requested wireless communication identity.

The IDs 116, 120, or 124 may be coupled to the mobile communication device 102 only. The IDs 116, 120, or 124 may be coupled to a subscriber identity module only. Alternatively, the IDs 116, 120, or 124 may be coupled to both the mobile communication device 102 and the subscriber identity module. The subscriber identity module here may be a physical virtual subscriber identity module or a virtual subscriber identity module. The virtual subscriber identity module may be stored in a remote server and may be downloaded. For example, the IDs 116, 120, and 124 may be coupled to a virtual subscriber identity module only and when the user of the mobile communication device 102 purchases another mobile communication device, the IDs 116, 120, and 124 may be downloaded from the remote server where the IDs 116, 120, and 124 are stored to the new mobile communication device. The IDs 116, 120, or 124 may be coupled in different ways. For example, the first ID 116 may be coupled to the mobile communication device 102 only while the third ID 124 may be coupled to both the mobile communication device 102 and the subscriber identity module.

In an embodiment, the wireless communication device 102 may be a generic device that may operate with different wireless communications service providers with different wireless communications technologies. For example, original equipment manufacturers (OEM) may produce generic wireless communication devices with different wireless communication identities that may operate with different wireless communications service providers with different technologies in different countries. For example, a generic wireless communication device may be able to operate with code division multiple access (CDMA) networks with a first wireless communications service provider in a first country and also with mobile communications (GSM) networks with a second wireless communications service provider in a second country.

Currently the inventory tracking number and network authentication identity of a mobile communication device is one same number. In an embodiment, the inventory tracking number and network authentication identity of the mobile communication device 102 may be separated out. For example, the inventory tracking number may be a different number from any of the network authentication identity included in the wireless communication identities.

The application 110 executes rules or functions to determine what wireless communication identity is active for wireless communications. The mobile communication device 102 may present a user interface on a display that provides controls for a user to select from among the IDs 116, 120, and 124 which wireless communication identity the application 110 is to make active on the mobile communication device 102. Additionally, the application 110 may monitor operational conditions and/or environmental conditions to determine triggering events and may select an ID 116, 120, 124 to make active based on the triggering events. Triggering events may comprise user inputs, for example a user input in a user interface of the mobile communication device 102 that selects an ID 116, 120, 124.

The application 110 may activate an ID 116, 120, 124 based on a current location of the mobile communication device 102, for example a location that corresponds to a work location or employer location, a private residence location, a hotel location, a domestic location, an international location, an urban location, a suburban location, or other location. The application 110 may provide a user interface promoting user definition of mapping or association of locations to IDs 116, 120, 124. The application 110 may activate an ID 116, 120, 124 based on time and a schedule, for example a work schedule. The application may provide a user interface promoting user definition of the schedule for activating IDs 116, 120, 124. The application 110 may activate an ID 116, 120, 124 based on analyzing a radio signal incident upon the mobile communication device 102, for example a WiFi signal received from a hotel hot spot or a cellular communication signal received from a picocell and/or a micro cellular base station. The application 110 may activate an ID 116, 120, 124 upon request. The requester of a wireless communication identity may provide the application 110 with the access key to the wireless communication identity. Provided with the correct access key, the application 110 may activate the requested wireless communication identity. Requests may comprise user inputs, for example a user input request with an access key to a corresponding wireless communication identity.

Different wireless communication identities may be activated by different triggering events. For example, the first ID 116 may be activated based on a work schedule and the third ID 124 may be activated based on a hotel location. An ID 116, 120, 124 may be activated by a single triggering event or by one of multiple triggering events. For example, the first ID 116 may be activated only by a work location and the second ID 120 may be activated either by a private residence location or an international location.

When the application 110 activates a different wireless communication identity 116, 120, 124, the application 110 may recalculate or redetermine operational run-time parameters of the mobile communication device 102 based on the ID and store these operational run-time parameters in the memory 108 and/or one or more registers of the processor 106. After recalculating and storing the operational run-time parameters, the application 110 may cause a radio modem of the cellular radio transceiver 104 to reset, thereby bringing the recalculated operational run-time parameters into effect. It is understood that resetting a radio modem may not cause a user partition of the memory 108 to be erased and/or user data to be lost as may sometimes be the case if a full device reset were performed.

User data associated with the active ID 116, 120, 124 may also be updated on the mobile communication device 102. User data associated with a wireless communication identity may comprise user preferences, service enrollment, application enablement, customization parameters, and/or a contact list. User data associated with an active ID 116, 120, 124 may be updated at the time of the ID 116, 120, 124 activation. Corresponding applications on the mobile communication device 102 may operate with updated user data afterwards.

While in FIG. 1 the application 110 is illustrated as outside of the trusted security zone 112, in an embodiment, the application 110 may be stored in the trusted security zone 112 and/or invoke functions provided by instructions stored in and/or executing within the trusted security zone 112. In an embodiment, the application 110 may read the information associated with the active wireless communication identity (e.g., read one of the IDs 116, 120, 124, for example by invoking a mediating access function that executes and/or is stored in the trusted security zone 112) and store this information in an area of memory 108 that is used to conduct wireless communications. In an embodiment, the active wireless communication identity may be stored in a plurality of different locations in the memory 108, possibly in non-contiguous areas of the memory 108.

In an embodiment, the application 110 may send the IDs, 116, 120, 124, corresponding wireless communication configurations, device rules, and/or associated user data to a remote server. For example, the application 110 may send the wireless communication identity, corresponding wireless communication configurations, device rules, and/or associated user data to a server, for example the server 136, 138, 140, or another server, and the server may store all those data. The application 110 may later fetch the wireless communication identity, corresponding wireless communication configurations, device rules, and/or associated user data from the remote server with which those data are stored under predefined circumstances. For example, when a mobile communication device is lost, the user may get a new mobile communication device and download the stored data from the remote server to the new device.

Figure 2:
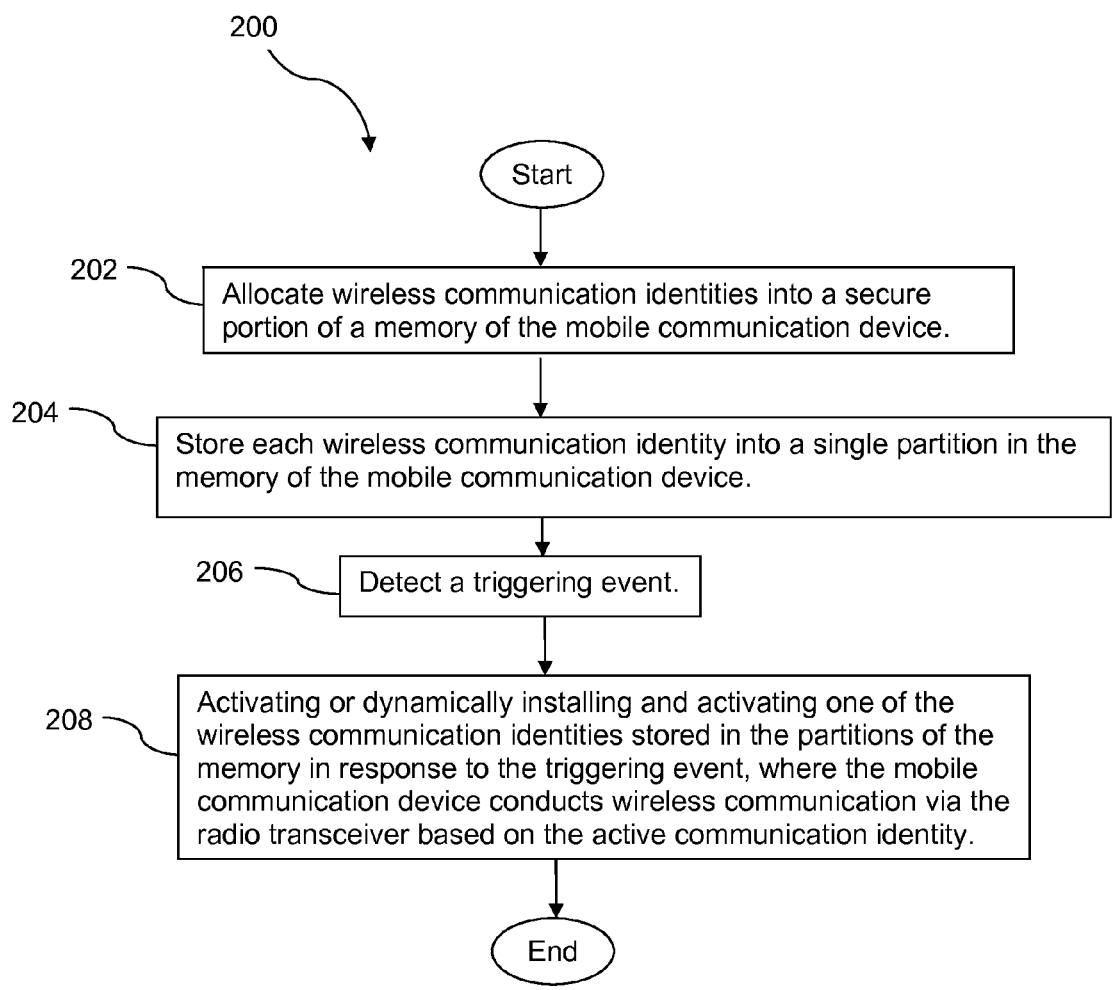
FIG. 2 is a flow chart illustrating a method according to an embodiment of the disclosure.

Turning now to FIG. 2, a method 200 is described. At block 202, two or more wireless communication identities are allocated into a secure portion of a memory of the mobile communication device. For example, the wireless communication identities may be allocated into a subscriber identity module card, a hardware assisted security zone (e.g. trusted security zone), a stand-alone chipset, or another secure part of a memory on the mobile communication device.

At block 204, each wireless communication identity is stored into a single partition in the memory of the mobile communication device. A secure part of a memory on the wireless communication device may be apportioned into different partitions. The limit of the total number of the partitions may depend on the total memory size allocated for the wireless communication identities. The size of each of the partition is not necessarily the same. In other words, different partitions may be of different sizes.

Different wireless communication identities may be allocated, stored, and installed in different manners. For example, the wireless communication identities may be loaded at the original equipment manufacturer (OEM) of the mobile communication device when the original equipment manufacturer knows where the mobile communication device will be shipped to and/or what wireless communication identities may be desired on the mobile communication device. The wireless communication identities may be installed later on by an application on the mobile communication device at the time of fulfillment or activation of the mobile communication device. The wireless communication identities may be allocated, stored, and installed by a remote server at the time of fulfillment or activation of the mobile communication device. A wireless communication identity may be allocated and stored on the mobile communication device first and then installed by the application on the mobile communication device when the mobile communication device changes to the wireless communication identity from a previous active wireless communication identity. Additionally, a wireless communication identity may be dynamically allocated and installed by the application on the mobile communication device when the mobile communication device changes to the wireless communication identity.

At block 206, a triggering event is detected. In an embodiment, a triggering event may trigger the change of wireless communication identities. An application on the mobile communication device may execute rules or functions to determine what wireless communication identity is active for wireless communications. The mobile communication device may provide a user interface on a display that provides controls for a user to select from among the available wireless communication identities on the mobile communication device to make active. Additionally, the application may monitor operational conditions and/or environmental conditions and determine triggering events. The application may activate a wireless communication identity when a triggering event is detected. Triggering events may comprise user inputs. Triggering events may comprise locations, time and schedules, radio signal incidents, requests, and other triggering events. Different wireless communication identities may be activated by different triggering events. Different wireless communication identities may be activated by different numbers of triggering events. For example, one wireless communication identity may be activated by a single triggering event and another wireless communication identity may be activated by one of multiple triggering events.

At block 208, one of the wireless communication identities stored in the partitions of the memory is activated or dynamically installed and activated in response to the triggering event, where the mobile communication device conducts wireless communication via the radio transceiver based on the active communication identity. Based on the triggering event and the corresponding rule to select the optimal or preferred wireless communication identity to activate, the selected wireless communication identity is activated or dynamically installed and activated by the application. When the installation of the wireless communication identity is involved, a partition in the memory is allocated to store the wireless communication identity and the wireless communication identity is installed into the partition and then activated. In an embodiment, the application then redetermines or recalculates operational run-time parameters of the mobile communication device based on the selected wireless communication identity and store these operational run-time parameters in the memory of the mobile communication device. The application may then cause a radio modem of the radio transceiver to reset, thus bringing the recalculated operational run-time parameters into effect. User data associated with the selected wireless communication identity may also be updated and stored. For example, the previous corresponding user data may be replaced by the new user data. Corresponding applications may then operate with the updated user data.

Figure 3:
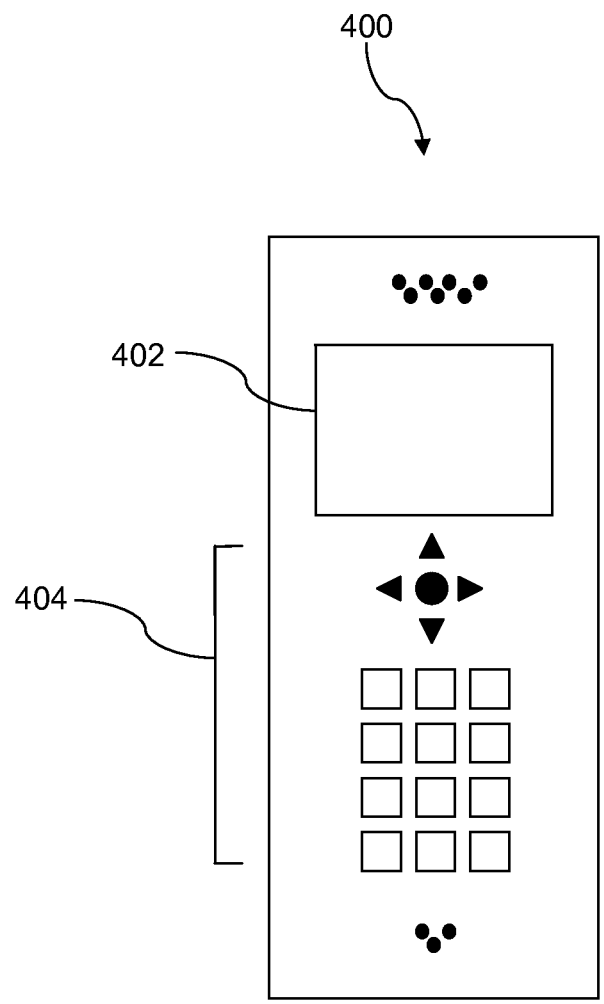
FIG. 3 is an illustration of a mobile communication device according to an embodiment of the disclosure.

FIG. 3 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 4:
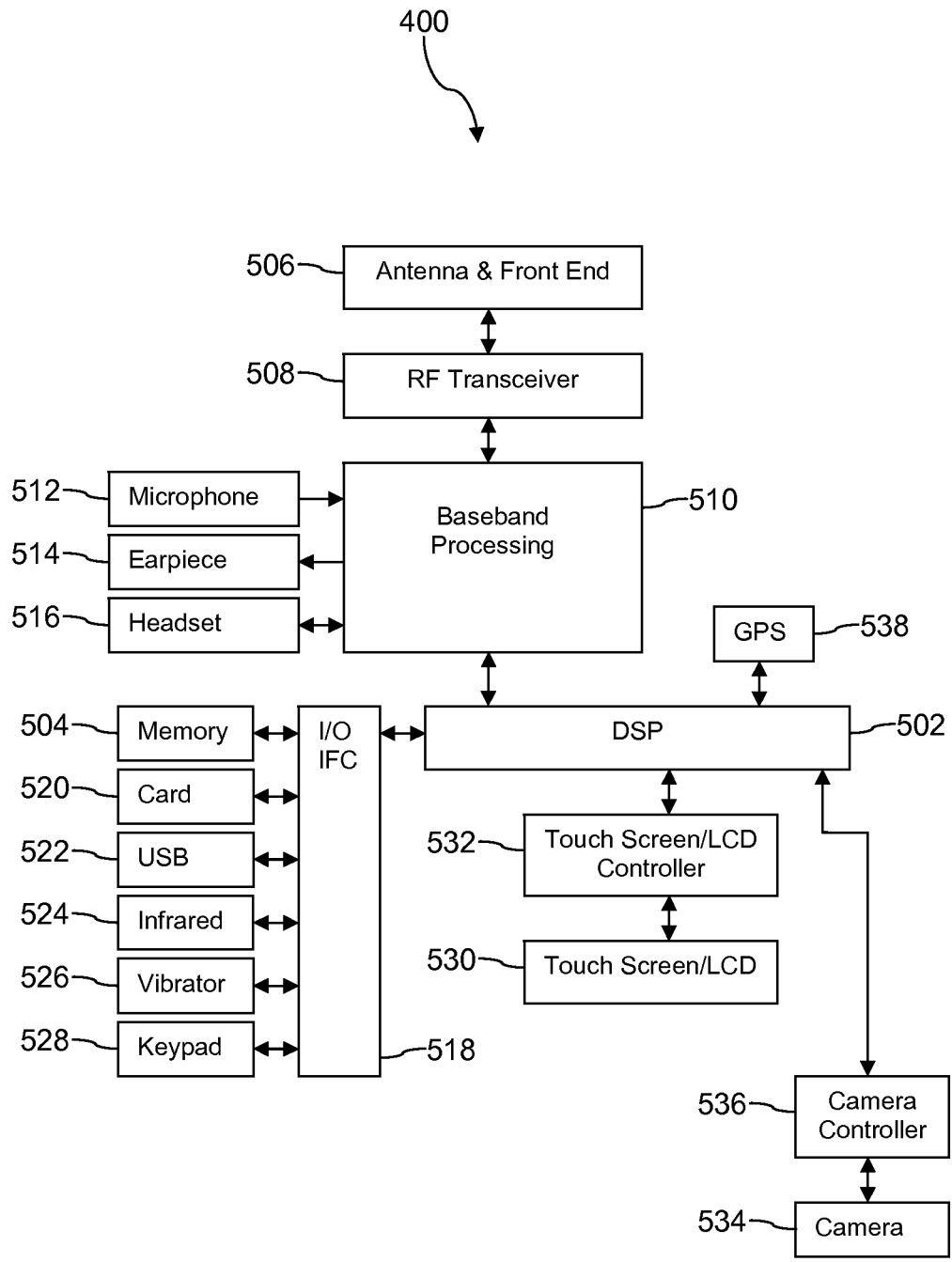
FIG. 4 is a block diagram of a mobile communication device according to an embodiment of the disclosure.

FIG. 4 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 5A:
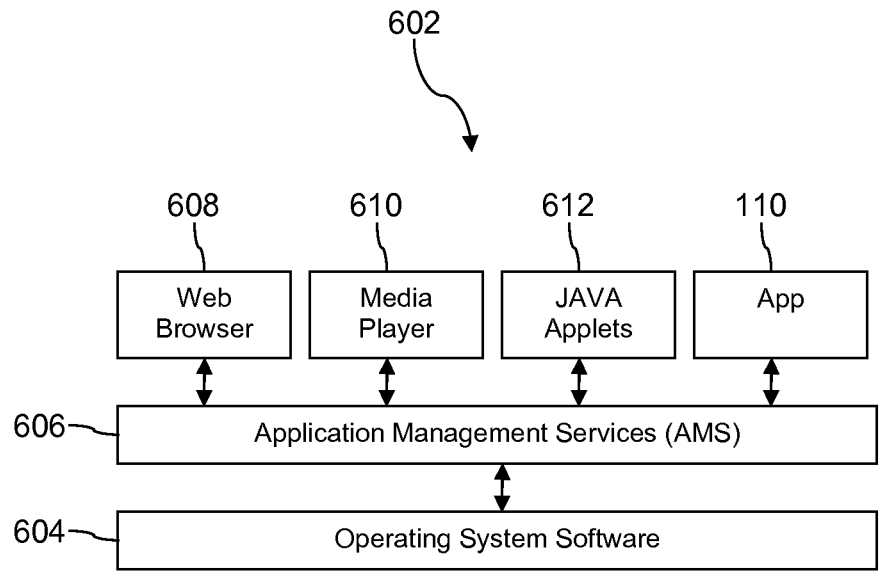
FIG. 5A is a block diagram of a software architecture of a mobile communication device according to an embodiment of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 5A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 5B:
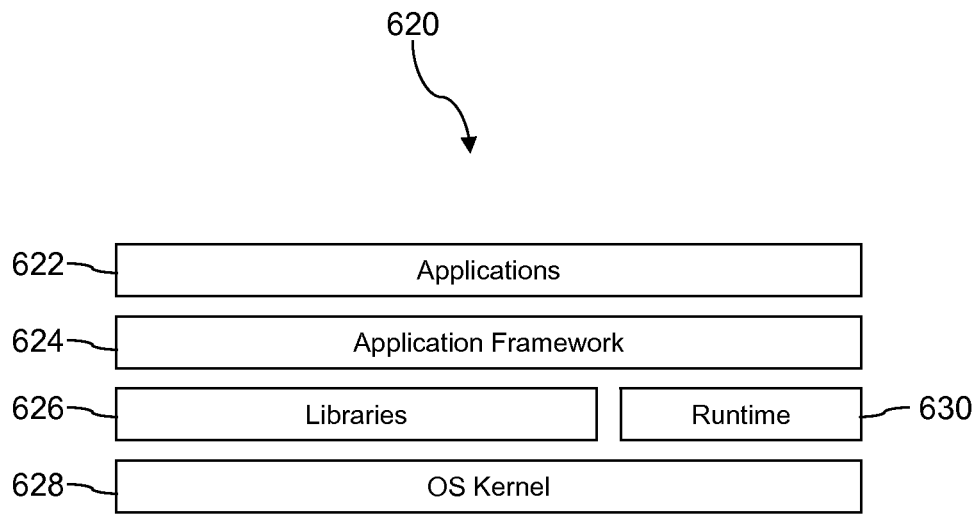
FIG. 5B is a block diagram of another software architecture of a mobile communication device according to an embodiment of the disclosure.

FIG. 5B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
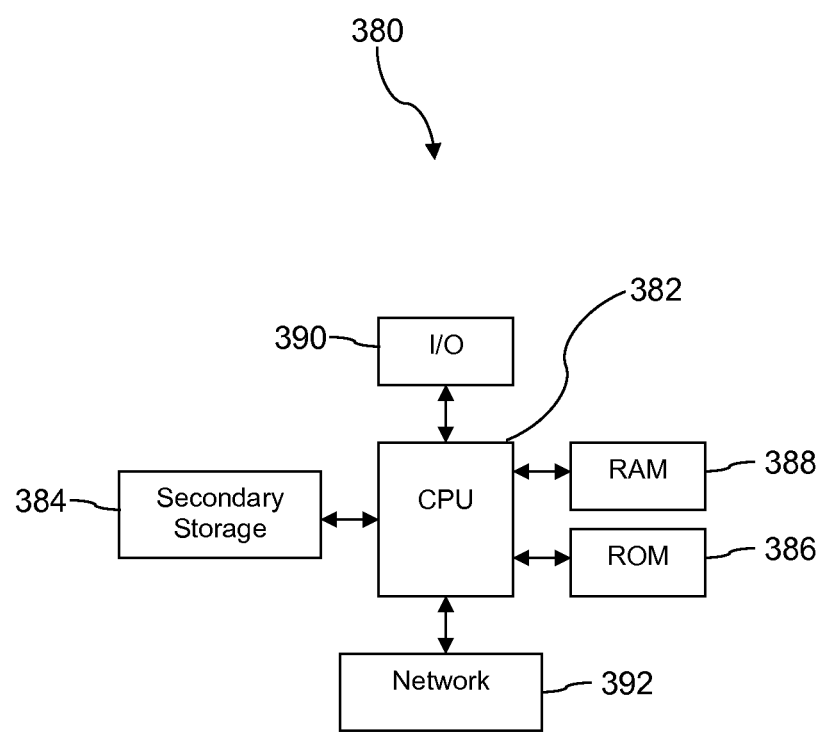
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer specification 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, comprising:
   a radio transceiver;
   a non-transitory memory integral with the mobile communication device, wherein the non-transitory memory comprises a secure portion that is apportioned into a plurality of partitions, the secure portion comprising:
      a first wireless communication identity stored in a first partition of the plurality of partitions in the secure portion, wherein each wireless communication identity comprises a network access identity, a list of wireless communication systems to which the mobile communication device is authorized to attach, a rule set for prioritizing among the wireless communication systems identified in the list, and a table of device rules;
      a second wireless communication identity stored in a second partition of the plurality of partitions, wherein the second wireless communication identity is different from the first wireless communication identity;
   a processor communicatively coupled to the non-transitory memory; and
   an application stored in the memory that, upon execution by the processor, configures the processor to:
      detect a triggering event,
      in response to the detection of the triggering event, select one of the wireless communication identities stored in at least one of the partitions of the secure portion in the non-transitory memory;
      activate the wireless communication identity selected for implementation;
      redetermine operational run-time parameters on the mobile communication device based on the activated wireless communication identity;
      update user data associated with the activated wireless communication identity;
      conduct wireless communication via the radio transceiver based on the redetermined operational run-time parameters; and
      operate one or more applications on the mobile communication device using the updated user data associated with the activated wireless communication identity.

2. The mobile communication device of claim 1, wherein different wireless communication identities are allocated by a connection, via the radio transceiver, with a secure server into different partitions in the non-transitory memory of the mobile communication device at the time of fulfillment or at the time of activation of the mobile communication device.

3. The mobile communication device of claim 1, wherein the application configures the processor to install the different wireless communication identities from data stored in a carrier partition that is outside of the secure portion of memory on the mobile communication.

4. The mobile communication device of claim 1, wherein the application is configured to receive at least a portion of the different wireless communication identities from a remote server.

5. The mobile communication device of claim 1, wherein data associated with at least one wireless communication identity is preloaded to the mobile communication device, and installed responsive to detection of the triggering event.

6. The mobile communication device of claim 1, wherein at least one of the wireless communication identities comprises at least one of a personal wireless communication identity, business wireless communication identity, production wireless communication identity, testing wireless communication identity, wireless communication identities for different wireless communication providers, wireless communication identities for different reward membership, or wireless communication identities for a mobile wallet.

7. The mobile communication device of claim 1, wherein the mobile communication device comprises a secure subsystem of hardware and software resources that are not accessible to components outside of the secure subsystem, wherein the secure portion of the non-transitory memory that stores wireless communication identities is located within the secure subsystem of the mobile communication device.

8. The mobile communication device of claim 7, wherein the secure portion in the non-transitory memory of the mobile communication device comprises at least one of a physical subscriber identity module card communicatively coupled with a processor of the mobile communication device, a hardware assisted security zone in the mobile communication device, or a stand-alone chipset in the mobile communication device.

9. A computer-implemented method for virtualizing a subscriber identity module on a mobile communication device, comprising:

allocating, by a processor configured by executing a trusted application on the mobile communication device, a plurality of wireless communication identities into a secure portion of a non-transitory memory of the mobile communication device;

storing, by the trusted application, each wireless communication identity of the plurality of wireless communication identities into at least one partition of a plurality of partitions in the secure portion of the mobile communication device;

detecting a triggering event on the mobile communication device;

dynamically installing, by executing the trusted application, one of the wireless communication identities stored in at least one of the plurality of partitions in response to the triggering event;

activating, by the trusted application executing in the secure portion, the wireless communication identity in response to the dynamic installation;

redetermining, by the trusted application, operational run-time parameters on the mobile communication device based on activating the wireless communication identity; and updating, by the trusted application, user data associated with the activated wireless communication identity, wherein the mobile communication device is configured to conduct wireless communication via a radio transceiver based on an activation of the wireless communication identity and the redetermined operational run-time parameters, and wherein one or more applications are configured to operate on the mobile communication device using the updated user data associated with the activated wireless communication identity.

10. The method of claim 9, wherein at least one wireless communication identity is stored across multiple secure partitions of the plurality of partitions.

11. The method of claim 9, wherein each partition in the secure portion is accessed with a different access key.

12. The method of claim 9, wherein at least one of the wireless communication identities is allocated by an application of the secure portion of the mobile communication device based on a request received from a secure portion executing on a secure server.

13. The method of claim 12, wherein the request comprises an access key associated with the partition storing the wireless communication identity, and wherein the trusted application distributes configuration parameters associated with the wireless communication identity corresponding to the request.

14. The method of claim 13, wherein the configuration parameters the trusted application distributes comprise an internal memory size allocation parameter and a file memory parameter that corresponds to the wireless communication identity corresponding to the request.

15. The method of claim 9, wherein the mobile communication device is configured by one of the plurality of wireless communication identities to operate with a wireless network of communications service provider that is different than another wireless communication identity of the plurality of wireless communication identities.

16. The method of claim 9, wherein the secure portion comprises an inventory tracking number data structure and a network authentication identity data structure that is separate from the inventory tracking number data structure.

17. The mobile communication device of claim 1, wherein a triggering event comprises at least one of: a radio signal incident from another device comprising a secure portion, a scheduled event, or a defined time period.

18. The mobile communication device of claim 1, wherein an active wireless communication identity is changed based on activation of the wireless communication identity selected.

19. The method claim 9, wherein the triggering event comprises at least two of: a change of locations of the mobile communication device, a radio signal incident, a scheduled event, or a defined time period.

* * * * *